(12) United States Patent
Kishida et al.

(10) Patent No.: US 6,361,867 B2
(45) Date of Patent: *Mar. 26, 2002

(54) LAMINATED GLASS SUBSTRATE STRUCTURE AND ITS MANUFACTURE

(75) Inventors: Katsuhiko Kishida; Katsunori Tanaka; Fumiko Shiono; Hirofumi Miyamoto, all of Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/040,734

(22) Filed: Mar. 18, 1998

(30) Foreign Application Priority Data

Mar. 19, 1996 (JP) ............................... 9-066796

(51) Int. Cl.⁷ ............................... B32B 31/00
(52) U.S. Cl. .............. 428/428; 156/154; 156/267; 451/44; 428/1
(58) Field of Search .............. 428/192, 1; 156/153, 156/154, 267; 65/61, 107; 451/44

(56) References Cited

U.S. PATENT DOCUMENTS 5,545,277 A * 8/1996 Hashemi et al. ............ 156/106

FOREIGN PATENT DOCUMENTS

| JP | 54-153745 | 12/1979 |
| JP | 61-50118 | 3/1986 |
| JP | 62-201493 | 9/1987 |
| JP | 63-257756 | 10/1988 |
| JP | 63-276025 | 11/1988 |
| JP | 3-171138 | 7/1991 |

* cited by examiner

Primary Examiner—Francis J. Lorin
(74) Attorney, Agent, or Firm—Greer, Burns & Crain, Ltd.

(57) ABSTRACT

A method of forming a laminated glass substrate structure suitable for use in a display device or the like, includes the steps of: a) preparing a first glass substrate having first and second main faces; b) preparing a second glass substrate having third and fourth main faces; c) after the steps a) and b), adhering the first and second glass substrates with a space formed therebetween and with the third main face facing to the second main face; and d) after the step c), performing a smoothing process relative to all edges excepting one edge among edges defining the first main face. The laminated glass substrate structure provides an improved load resistance.

13 Claims, 6 Drawing Sheets

FIG.5

| SAMPLE S1: CONVENTIONAL PRODUCT, CHAMFERING AT TWO SIDES | SAMPLE S2: CHAMFERING AT FOUR SIDES | SAMPLE S3: CHAMFERING AT THREE SIDES (EXCEPTING INJECTION PORT SIDE) | SAMPLE S4: CHAMFERING AT TWO SIDES AND RESIN COATING AT FOUR SIDES | SAMPLE S5: CHAMFERING AT TWO SIDES AND RESIN COATING AT ONE SIDE (EXCEPTING INJECTION PORT SIDE) | SAMPLE S6: CHAMFERING AT TWO SIDES AND RESIN COATING AT ONE SIDE (INJECTION PORT SIDE) |
|---|---|---|---|---|---|
| 6.3 Kgf | 18.5 Kgf | 21.3 Kgf | 13.3 Kgf | 17.1 Kgf | 18.2 Kgf |
| 9.5 Kgf | 17.2 Kgf | 14.1 Kgf | 13.5 Kgf | 24.7 Kgf | 17.7 Kgf |
| 13.2 Kgf | 18.7 Kgf | | 15.0 Kgf | | |
| | 33.3 Kgf | | 21.8 Kgf | | |
| 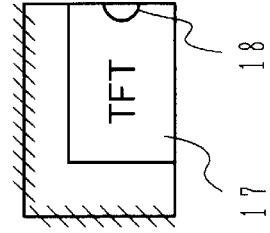 | 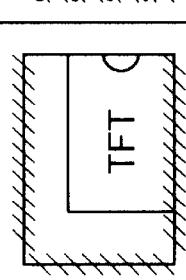 | 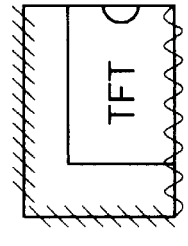 | 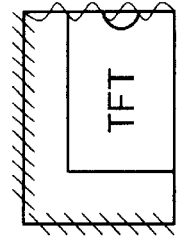 | | |

//// CHAMFERING    ∧∧ HARD RESIN COATING

LAMINATED GLASS SUBSTRATE STRUCTURE AND ITS MANUFACTURE

This application is based on Japanese Patent Application No. 9-66796 filed on Mar. 19, 1997, the entire contents of which are incorporated herein by reference.

BACKGROUND OF THE INVENTION a) Field of the Invention

The present invention relates to a glass substrate structure and its manufacture method, and more particularly to a laminated glass substrate structure suitable for a display device or the like and its manufacture method.

b) Description of the Related Art

A glass substrate has the characteristics that it is hard and not susceptible to scratches and that a transparent glass substrate can be manufactured easily. By positively utilizing these characteristics, a glass substrate is used for forming various types of windows and display panels. For example, a liquid crystal display (LCD) is formed by laminating a pair of glass substrates and injecting liquid crystal into liquid crystal cells formed in between the pair of glass substrates. A plasma display panel (PDP) also uses a similar laminated glass substrate structure.

A glass substrate of a desired size is formed from a large plate glass by scribing the surface with a diamond cutter or the like and cleaving it by applying a bending stress. For example, in the manufacture of a liquid crystal display, a large plate glass is often cut into four pieces (generally called "four-plane cut"). It is known that a cut plane of glass has very sharp edges. In order to avoid handling danger or in order to prevent the generation of glass chips at processes after cutting, it is also known to chamfer each edge of a glass substrate.

If foreign materials such as chips of glass substrates are mixed, a fatal defect such as pin holes may be formed in glass substrates of photomasks or electronic devices such as LCD. It is known that micro cracks are formed in a glass substrate chamfered by mechanical grinding with diamond or the like and may generate fine particles. Various methods have been proposed in order to prevent the generation of fine particles from a glass substrate.

One problem associated with a glass substrate is that it is heavier than a plastic plate or the like. A glass substrate structure, particularly a laminated glass substrate structure with a pair of glass substrates adhered together, is likely to become heavy. A laminated structure often becomes thick. Using a thin glass substrate has been desired in order to thin and lighten LCDs and PDPs. However, a thin glass substrate is easy to be broken. It is desired that cracks and breaks are not formed if an applied pressure is within a predetermined range, although this range depends on application fields of glass substrates.

For example, consideration should be paid to the fact that a user often presses the display surface of LCD. It is required that a laminated glass substrate structure of LCD is not broken even if a pressure within a certain range is applied to the display surface.

In a laminated glass substrate structure of LCD, a resistance to pressure applied to the structure in one direction is required to have a certain value or larger, as described above. However, techniques for improving such a load resistance of a glass substrate are not know to date.

SUMMARY OF THE INVENTION

It is an object of the present invention to provide a laminated glass substrate structure with an improved load resistance.

It is another object of the present invention to provide a method of manufacturing a laminated glass substrate structure capable of improving a load resistance.

According to one aspect of the present invention, there is provided a laminated glass substrate structure comprising: a first glass substrate having first and second main faces, all edges excepting one edge among edges defining the first main face having been subjected to a smoothing process; and a second glass substrate having third and fourth main faces, two edges among edges defining the fourth main face not subjected to the smoothing process, the second glass substrate being adhered to the first glass substrate with a space formed therebetween and with the third main face facing to the second main face.

According to another aspect of the present invention, there is provided a method of forming a laminated glass substrate structure, comprising the steps of: a) preparing a first glass substrate having first and second main faces; b) preparing a second glass substrate having third and fourth main faces; c) after the steps a) and b), adhering the first and second glass substrates with a space formed therebetween and with the third main face facing to the second main face; and d) after the step c), performing a smoothing process relative to all edges excepting one edge among edges defining the first main face. The laminated glass substrate structure provides an improved load resistance. According to the experiments made by the present inventors, as a pressure is applied to one surface of a laminated glass substrate structure, first break occurs in a glass substrate on the side opposite to the glass substrate applied with the pressure. A break of a glass substrate mainly occurs in a surface applied with a tensile stress.

It has been found that a glass substrate having edges with micro cracks or chips and applied with a static load breaks by extending a crack or chip on one side to another one on another side. Namely, if a glass substrate has cracks or chips on only one side, the glass substrate is hard to be broken.

The load resistance of a glass substrate can therefore be improved by performing the smoothing process for edges excepting one among all edges defining the first main face applied with a largest tensile stress.

All the edges may also be subjected to a smoothing process or processes.

The smoothing process improves a resistance to a static load to be applied by a user of a laminated glass substrate so that it is sufficient if this process is performed after a pair of glass substrates is adhered. A pair of glass substrates is often adhered together by making at least two sides flush with each other. In such a case, if the smoothing process is performed for the flushed two sides of one of the substrates required of a higher load resistance, the smoothing process is often performed also for two sides of a glass substrate which is less required to be made resistant to a static load.

As above, the load resistance of a laminated glass substrate can be improved.

BRIEF DESCRIPTION OF THE DRAWINGS

FIG. 5 is a table showing experiment results of samples formed by the embodiment methods of the invention.

DETAILED DESCRIPTION OF THE PREFERRED EMBODIMENTS

Prior to describing the embodiments of the invention, preliminary experiments made by the present inventors will be explained. FIGS. 6A to 6E are schematic diagrams illustrating the preliminary experiments.

Figure 6A:
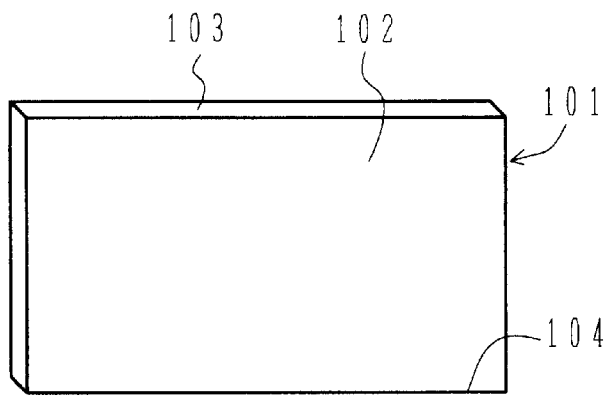
FIGS. 6A to 6E are a perspective view and schematic diagrams illustrating preliminary experiments made by the present inventors.

FIG. 6A shows a glass substrate 101 cut in a predetermined size. The glass substrate 101 has a pair of main faces 102 and side faces 103. An edge 104 is formed at the boundary between the main face 102 and each side face 103. Namely, the main face 102 is defined by four edges 104.

Figure 6E:
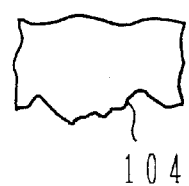
Figure 6B:
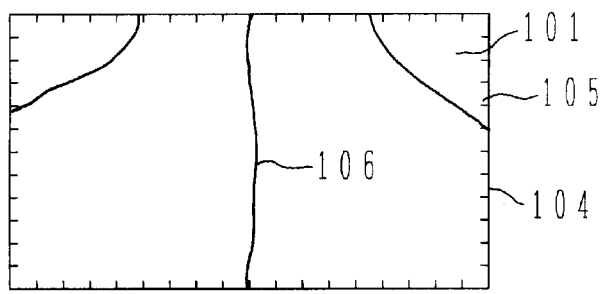

FIG. 6B is a schematic diagram showing in a magnified scale an edge of a glass substrate cut with a diamond cutter.

Small cracks and chippings can be observed at an edge 104.

Figure 6C:

FIG. 6C is a schematic plan view of a glass substrate with breaks formed by a static load experiment. Small cracks and chips 105 exist on edges 104 of the glass substrate. As a static load was applied to one main face of the glass substrate 101, a break 106 was formed.

It has been found that every break extends between different sides and does not couple different cracks and chips on the same side. A break is supposedly formed if latent cracks and chips at the edges 104 extend and the latent cracks generated from two cracks or chips meet together, while a static load is applied to the glass substrate 101.

If a process of removing or mitigating cracks and chips 105 of the glass substrate 101 is performed, it is expected that latent cracks can be prevented from being extended by a static load and the load resistance can be improved.

On the basis of the experiment results that each break 106 does not terminate at the same side, it can be presumed that it is sufficient if a process of removing or mitigating cracks and chips is performed for three sides of a rectangular glass substrate. The process of removing or mitigating cracks and chips is not necessary to be performed for the remaining one side.

Such a process of reducing the effects of cracks and chips of a glass substrate is called a smoothing process (rough surface removing or mitigating process).

Figure 6D:
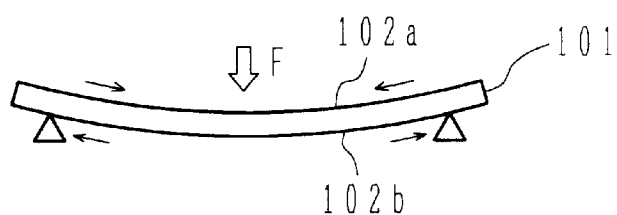

FIG. 6D illustrates an experiment of applying a static load to a laminated glass substrate structure made of a pair of glass substrates adhered together. A pair of glass substrates 111 and 112 is adhered together at their peripheral areas, with a space being formed in the inside. The space between the glass substrates 111 and 112 is filled with liquid crystal and hermetically sealed.

A static load F was applied down to the pair of laminated glass substrates 111 and 112. A break was formed always first at the lower glass substrate 112 when the static load F was applied to the upper glass substrate 111 downward. As the laminated glass substrates 111 and 112 are bent by the static load F, the upper glass substrate 111 is applied with a compressive stress and bent while being compressed, whereas the lower glass substrate 112 is applied with a tensile stress and bent while being expanded. A break formed always first at the lower glass substrate 112 suggests that a glass substrate is weak against a tensile stress or bending tensile stress.

Assuming that a static load is applied always in one direction, it is sufficient that countermeasures against a break of a laminated substrate are performed only for the substrate opposite to the side where a static load is applied. In other words, a resistance to a break can be improved if only the substrate to be applied with a tensile stress is reinforced.

FIG. 6E illustrates how a static load applied to a single glass substrate works. As a static load F is applied to a single glass substrate 101, the substrate 101 is bent. In this case, a main face 102a on which the static load is applied receives a stress with relatively high compression, whereas a main face 102a opposite to the static load applied side receives a stress with relatively high tensile. It can be expected therefore that the load resistance of the glass substrate 101 can be improved if the main face 102b to be deformed in an outward convex is reinforced, when considered in the unit of main face.

Next, embodiments of the invention based upon the results of the above-described preliminary experiments will be described.

Figure 1A:
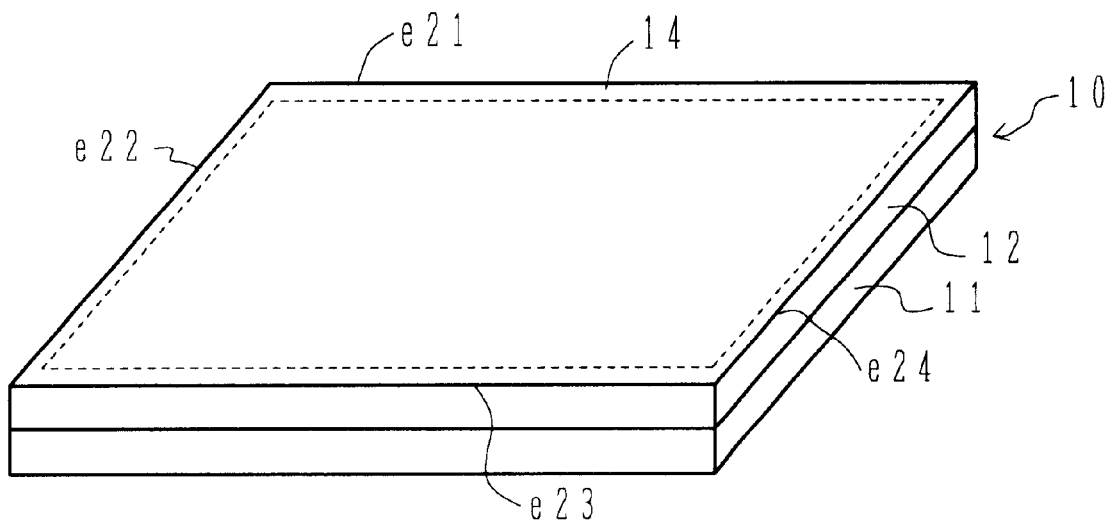
FIGS. 1A and 1B are perspective views of laminated glass substrate structures according to embodiments of the invention.
Figure 1B:
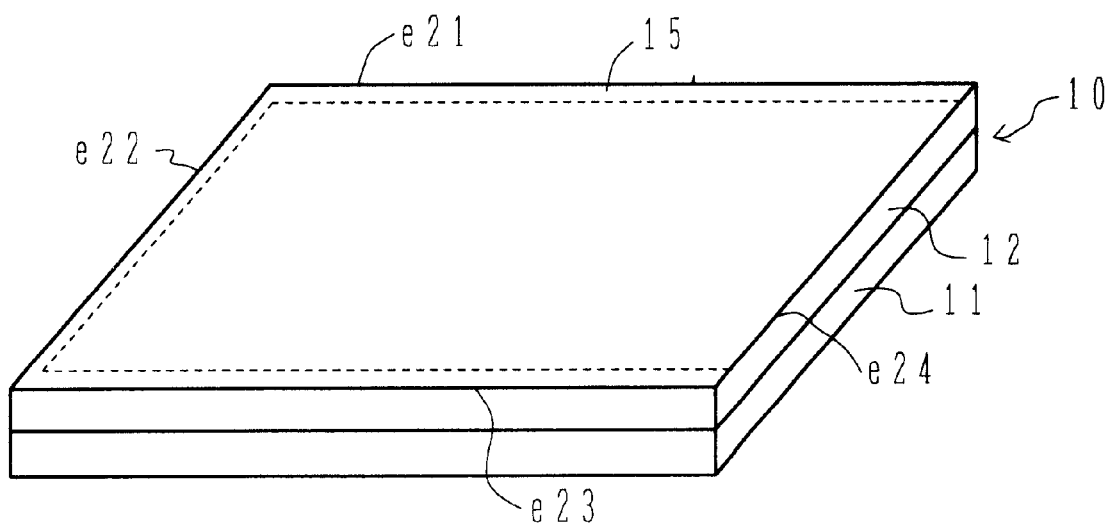

FIGS. 1A and 1B are perspective views of laminated glass substrate structures according to embodiments of the invention.

Referring to FIG. 1A, a pair of glass substrates 11 and 12 is adhered together at their opposing areas to form a laminated glass substrate structure 10. Adhesion may be performed at their whole opposing areas or at their peripheral areas. The upper main face of the upper glass substrate 12 is defined by four edges e21 to e24.

It is assumed that the laminated glass substrate structure 10 receives a static load applied in a direction from the lower to upper. A smoothing process is performed for a peripheral area 14 along the four sides of the upper glass substrate 12. The peripheral area 14 is a looped area along the four edges e21 to e24 defining the upper main face of the upper glass substrate 12. The smoothing process is performed to the extent that the effects of rough surface such as cracks and chips on the edges e21 to e24 are sufficiently lowered.

Figure 2A:
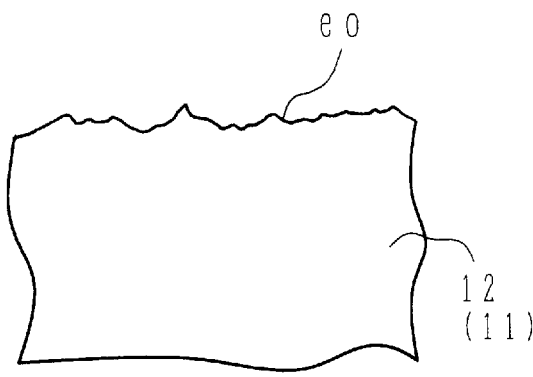
FIGS. 2A to 2E are schematic plan views illustrating smoothing processes (rough surface removing or mitigating processes) according to embodiments of the invention.

FIGS. 2A to 2E are schematic partial plan views of a main face of a glass substrate, illustrating the smoothing process to be executed for edges of a glass substrate. Here, the smoothing process on an edge includes a process of treating only the edge and a process of treating a side face defining the edge. FIG. 2A shows a glass substrate 12 (11) before the smoothing process is executed. A side face including an edge eo of the glass substrate 12 before the smoothing process has a rough surface including small cracks and chips.

Figure 2D:
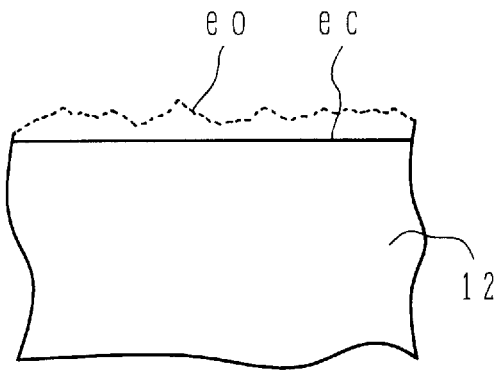
Figure 2B:
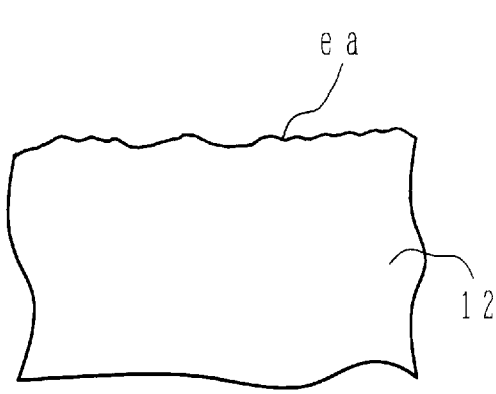

FIG. 2B illustrates a smoothing process of mitigating a rough surface. An edge ea (and a side face defining the edge ea) after the smoothing process has a mitigated rough surface as compared to the edge eo (and the side face) before the smoothing process, and the rough surface of sharp edges and cracks is rounded. Such a smoothing process may be a heating/melting process. As the edge portion of the glass substrate 12 is heated and melted, convex areas are melted and flowed to a nearby area to fill concave areas. Therefore, the processed edge ea has a rounded rough surface.

Similar rough surface mitigating effects can be obtained by a dissolving process using hydrofluoric acid, in place of the heating/melting process.

Figure 2E:
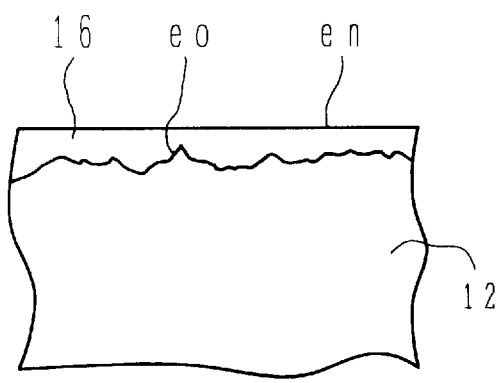
Figure 2C:
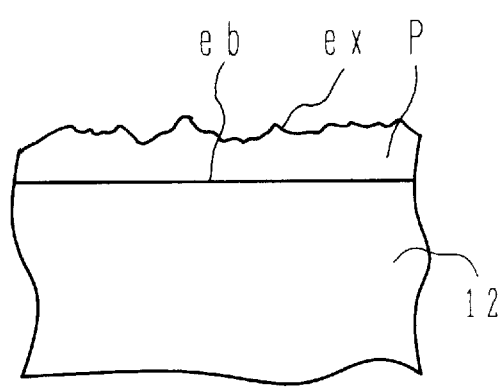

FIG. 2C illustrates a chamfering process. An edge portion of a glass substrate is lapped or polished obliquely to form a lapped face P. The boundary between the lapped face P and the main face forms a new edge eb, and the boundary between the lapped face and the side face forms another edge ex. If the new edge eb, formed between the main face and the lapped face P formed through a chamfering process, is smooth, generation of a break of the glass substrate is suppressed. The effects of this lapped face P can be retained if the new edge eb has a more mitigated rough surface than the original edge eo. The larger a chamfer width (d1 to d4 in FIGS. 4D and 4E), the better, although it depends on a depth of cracks and chips. If a chamfer width is larger, a deeper rough surface can be removed, assuming that the chamfer angle is constant. The chamfer angle ($\theta 1$, $\theta 2$ in FIGS. 4D and 4E) may be set in the range from 180° to 90°. In practical use, the chamfer width may be 0.1 to 0.5 mm, more preferably 0.2 to 0.5 mm and the chamfer angle may be 120° to 150°.

FIG. 2D illustrates a smoothing process in which one side face with a rough surface of a glass substrate 12 is lapped to form a flat side face. As the side face is lapped, the original edge eo is changed to a new edge ec. This process may be a process similar to the lapping process shown in FIG. 2C.

The process described with FIGS. 2C and 2D may be performed by abrasion. Abrasion may be conducted by using ultraviolet laser, $Co_2$ laser or the like. With abrasion, a region radiated with energy such as laser light is sublimated without experiencing a liquid phase, and the surface can be exhausted or consumed like lapping or polishing.

FIG. 2E illustrates a smoothing process through hard resin coating. Here, hard resin also includes a thermal or an optical setting resin. The side face of a glass substrate 12, at least an area including an edge, is coated with hard resin 16. The original edge eo is embedded in the hard resin 16 and a new edge en is formed. If the hard resin 16 can sufficiently suppress the rough surface effects of extending cracks, the load resistance of the glass substrate 12 can be improved. For example, the rough surface effects can be suppressed by coating polyimide.

In the embodiment shown in FIG. 1A, the smoothing process is performed with respect to the four sides, along the four edges, of the glass substrate 12 with a rough surface. Presence of the peripheral area 14 subjected to such a smoothing process improves the resistance to a static load applied, from the lower to upper, to the laminated glass substrate structure 10.

A peripheral area of the lower glass substrate 11 may also be subjected to the similar smoothing process. In this case, the load resistance can be improved even if a static load is applied, from the upper to lower, to a laminated glass substrate structure.

FIG. 1B illustrates another embodiment of the invention. This laminated glass substrate structure 10 has the same configuration as FIG. 1A. In this embodiment, the smoothing process is performed with respect to a peripheral area 15 excepting one side which forms an edge e24. If three sides of a rectangular substrate are subjected to the smoothing process, the load resistance can be improved even if the remaining one side is not subjected to the smoothing process, because a break terminating at the same side is not formed as described earlier.

Similar to the case shown in FIG. 1A, the smoothing process may also be performed for a lower glass substrate 11, like an upper glass substrate 12. In this case, one side which is not subjected to the smoothing process may be the same side of the upper glass substrate 12 or a different side.

FIGS. 3A to 3D show a liquid crystal display according to an embodiment of the invention.

Figure 3A:
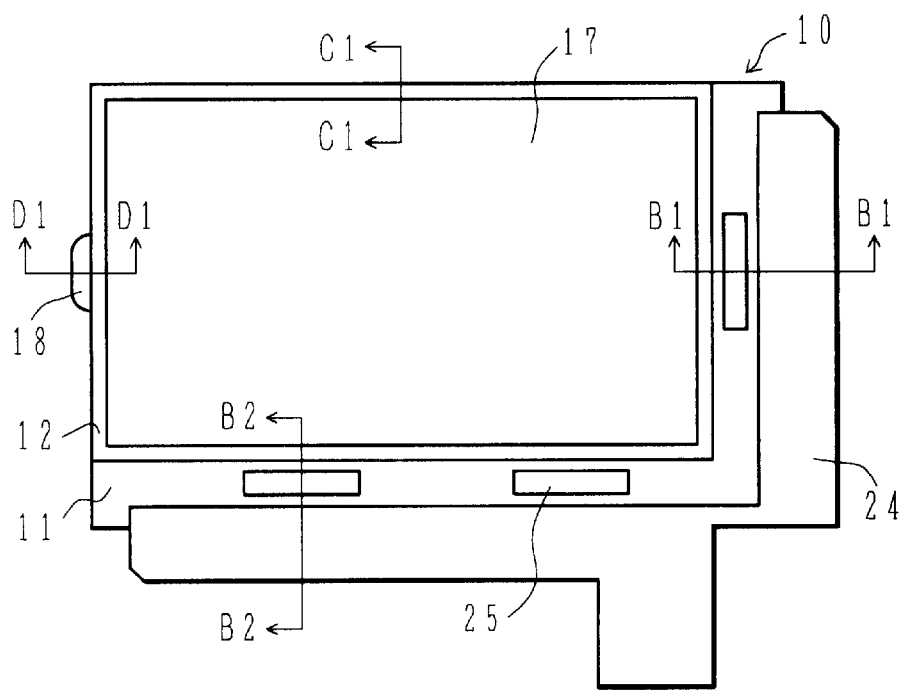
FIGS. 3A to 3D are a plan view and cross sectional views showing a liquid crystal display according to an embodiment of the invention.

As shown in FIG. 3A, the liquid crystal display has a laminated glass substrate structure 10 made of a lower glass substrate 11 and an upper glass substrate 12 adhered together. The size of the upper glass substrate 12 is smaller than that of the lower glass substrate 11. The upper glass substrate 12 is adhered to the lower glass substrate 11 at the peripheral area, exposing some area of the lower substrate at the lower and right sides. A flexible print circuit board 24 is connected to an outer area along the lower and right sides of the lower glass substrate 11. More generally, a connector is connected to the laminated glass substrate structure. In this case, the connector includes a flexible printed circuit (FPC), a tape automated bonding (TAB), a tape carrier package (TCP), and the like. Semiconductor integrated circuit (IC) blocks 25 are mounted on the intermediate areas between the flexible print circuit board 24 and the upper glass substrate 12. An area 17 excepting an outer peripheral area of the upper glass substrate 12 forms a display screen. A liquid crystal injection port 18 is formed to inject liquid crystal into an inner space between the upper and lower glass substrates 12 and 11. After the liquid crystal is injected, the injection port 18 is hermetically sealed.

For example, a thin film transistor circuit is formed on the lower glass substrate 11, and connection wires to a driver circuit for the transistor circuit are led to the areas at the lower and right sides which the upper glass substrate 12 does not cover. The upper glass substrate 12 is formed with, for example, a color filter structure. With this arrangement, the liquid crystal display can achieve a color display.

Figure 3B:
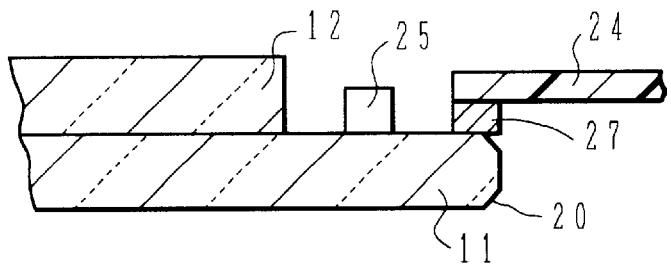

FIG. 3B shows the cross sectional structure of the liquid crystal display, taken along lines B1—B1 and B2—B2 shown in FIG. 3A. IC 25 is disposed in the right side area of the lower glass substrate 11, and the flexible print circuit board 24 is bonded to the area at the right of IC 25 via an anisotropic conductive film 27. The anisotropic conductive film 27 has conductivity only in the vertical (thickness) direction and presents no conductivity in the in-plane direction.

The upper glass substrate 12 is disposed in the right area of the lower glass substrate 11. Between the upper and lower glass substrates 12 and 11, a liquid crystal layer is formed which is not shown for the purpose of simplifying the drawings. Also, lead wires and thin film transistor structures on both the substrates are not shown. For general knowledge of a liquid crystal display, reference may be made to, for example, U.S. Pat. No. 5,473,455 which is incorporated herein by reference.

C-chamfered faces 20 are formed at upper and lower edges of the lower glass substrate 11. C-chamfering is performed over the whole lengths of the right and lower sides of the laminated glass substrate structure 10 (in fact on the lower substrate 11 only).

Figure 3C:
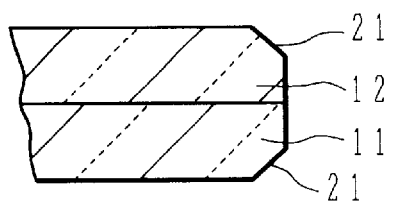

FIG. 3C is a cross sectional view taken along line C1—C1 shown in FIG. 3A. At this side, the side faces of the lower and upper glass substrates 11 and 12 adhered together are made flush with each other, forming a common side face. C-chamfered faces are formed over the whole length of this side of the laminated glass substrate structure. Namely, chamfering is performed at this side only for the outside edge of each of the glass substrates 11 and 12 where there is the upper substrate.

Although C-chamfering is performed both in FIGS. 3B and 3C, chamfering may be performed only along the lower edge.

If a difference of processes between C-chamfering and chamfering for only the lower edge is not so large, it is preferable to perform C-chamfering.

Figure 3D:
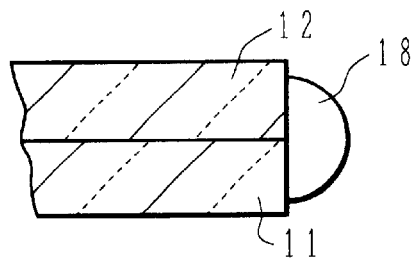

FIG. 3D is a cross sectional view taken along line D1—D1 shown in FIG. 3A. This side has the injection port 18 so that if a mechanical process such as lapping is performed, the injection port 18 may be damaged. Therefore, the smoothing process is not performed for this side. A smoothing process through hard resin coating may be performed for this side.

In the liquid crystal display shown in FIGS. 3A to 3D, among the four edges defining the lower main face of the lower glass substrate, the three edges are formed with the chamfered faces 20 and 21, and the remaining edge is not formed with a chamfered face.

Of the four edges defining the upper main face of the upper glass substrate 12, although one edge is formed with the chamfered face 21, the other edges are not formed with a chamfered face. This chamfered face at a single edge was formed as a by-product of the chamfering process for the lower glass substrate.

FIGS. 4A to 4D illustrate the main processes of a method of manufacturing a liquid crystal display such as shown in FIGS. 3A to 3D.

Figure 4A:
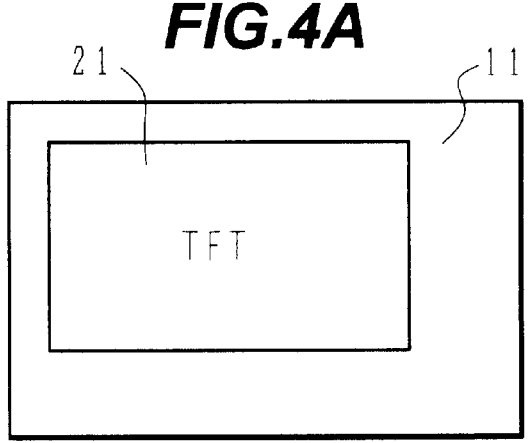
FIGS. 4A to 4E are plan views and cross sectional views illustrating main processes of a manufacture method of a liquid crystal display according to an embodiment of the invention.

As shown in FIG. 4A, a lower substrate 11 is prepared. A thin film transistor circuit 21 is formed on the display screen of the lower substrate 11. The thin film transistor circuit can be formed by a known method. Although the glass substrate 11 having a size matching a single liquid crystal display is shown, a predetermined area of a large single plate of glass may be used as the glass substrate 11 at this process.

Figure 4B:
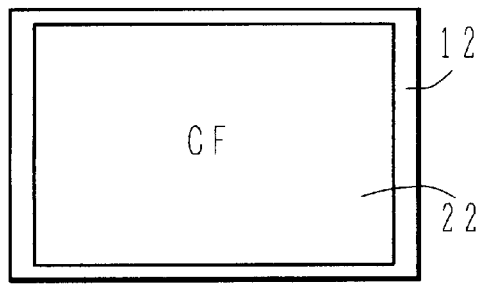

As shown in FIG. 4B, an upper glass substrate 12 is prepared. A color filter array 22 is formed on the upper glass substrate 12. The color filter array 22 can be formed by a known method.

Figure 4C:
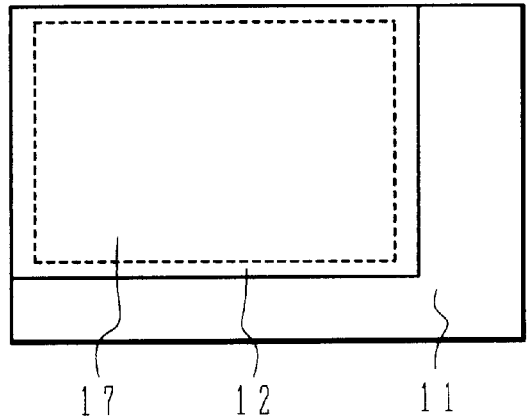

As shown in FIG. 4C, the upper glass substrate 12 is adhered to the lower glass substrate 11. A display screen 17 is defined by an area excepting the peripheral adhesion area of the upper glass substrate 12. In the area of the display screen, the thin film transistor circuit 21 is disposed on the lower substrate 11 and the color filter array 22 is disposed on the upper substrate 12. Between the thin film transistor circuit 21 and color filter array 22, a liquid crystal layer is formed. Liquid crystal can be injected through an injection port formed, for example, at the upper or left side of the laminated glass substrate structure. A process of injecting liquid crystal may be a known surface tension method, a known vacuum injection method, or the like.

Figure 4D:
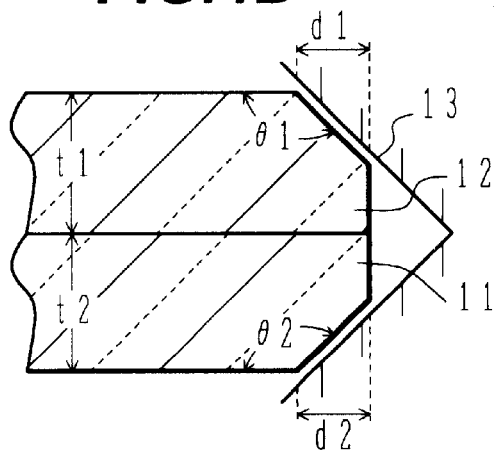
Figure 4E:
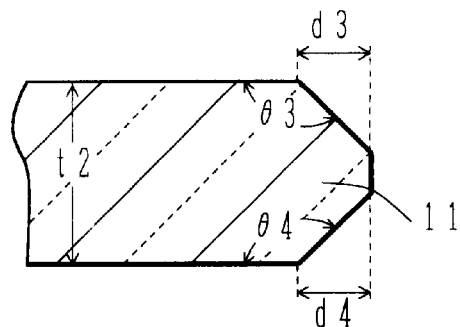

As shown in FIGS. 4D and 4E, after the upper glass substrate 12 is adhered to the lower glass substrate 11, the laminated glass substrate structure is subjected to a chamfering process.

FIG. 4D illustrates a chamfering process for the common side face formed by the lower and upper glass substrates 11 and 12. A lapping tool 13 is used for performing C-chamfering. The lower edge portion of the lower glass substrate 11 and the upper edge portion of the upper glass substrate 12 are chamfered.

The thickness t1 of the upper glass substrate 12 and the thickness t2 of the lower glass substrate 11 are both about 0.7 mm. The chamfer width d1 of the upper glass substrate 12 and the chamfer width d2 of the lower glass substrate 11 are both about 0.1 mm to 0.5 mm. The angles θ1 and θ2 between the chamfered faces and main faces are about 135° to 150°, for example.

FIG. 4E illustrates C-chamfering at the area where the upper glass substrate 12 does not exist. Since the upper glass substrate 12 does not exist in this area, C-chamfering is performed with respect to the lower glass substrate 11. The chamfer width d3 on the upper main face side and the chamfer width d4 on the lower main face side are equal to the chamfer widths d1 and d2 shown in FIG. 4D. The chamfer angles θ3 and θ4 are also equal to the chamfer angles θ1 and θ2 shown in FIG. 4D.

After the chamfering process, IC and a flexible print circuit board such as shown in FIG. 3A are mounted if necessary on the laminated glass substrate structure.

Although the chamfering process is used as the smoothing process in the above, other smoothing processes illustrated in FIGS. 2B to 2E may also be selectively used.

FIG. 5 shows the experiment results of various smoothing processes, including measured load resistances of liquid crystal displays using laminated glass substrate structures. The structure of each sample is schematically illustrated in the lower portion of this table.

Sample S1 had a conventionally known structure, with only the areas exposing the lower glass substrate at two sides being subjected to chamfering.

Sample S2 was subjected to chamfering at lower four sides of the lower glass substrate.

Sample S3 was subjected to chamfering at three sides of the lower glass substrate, excepting the side formed with an injection port.

Sample S4 was subjected to chamfering at the two sides same as Sample S1 and also to smoothing thorough hard resin coating at all four sides.

Sample S5 was subjected to chamfering at the two sides same as Sample S1 and also to smoothing thorough hard resin coating at one of the remaining two sides excepting the side formed with an injection port.

Sample S6 was subjected to chamfering at the two sides same as Sample S1 and also to smoothing through hard resin coating at the side formed with an injection port.

Of Samples S2 to S6 formed by the embodiment methods, Samples S2 and S4 were subjected to the smoothing process at all four sides of the lower glass substrate, and Samples S3, S5 and S6 were subjected to the smoothing process at three sides among the four sides.

Values shown in the table indicate loads when a break was formed at the lower glass substrate as a static load was applied to the liquid crystal displays using the laminated glass substrate structures, from the display screen side. None of Samples had a break at the upper glass substrate before a break at the lower glass substrate was formed. Many of Samples S1 with chamfering only at two sides as in a conventional manner had a break at a static load of less than 10 Kg weight, meaning insufficient static load resistance.

In contrast, all other samples S2 to S6 had a load resistance of 10 Kg weight or larger. It can be said that the static load resistance was improved sufficiently.

Although a decision cannot be definitely made because of a wide distribution of values of measured static load resistances, it can be said that the static load resistance of Sample S2 in particular, which was subjected to chamfering at all four sides of the lower glass substrate, is excellent. As compared with Sample S4 with the smoothing process at all four sides, the experiment results of Samples S3, S5 and S6 with the smoothing process only at three sides imply that the same or similar effects as the smoothing process at four sides can be expected for the smoothing process even at three sides.

The present invention has been described in connection with the preferred embodiments. The invention is not limited only to the above embodiments. For example, similar effects of the smoothing process will be obtained also by other laminated glass structures such as plasma display panels. It is apparent that various modifications, improvements, combinations, and the like can be made by those skilled in the art.

What is claimed is:

1. A laminated glass substrate structure comprising:
    a first glass substrate having first and second main faces, said first main face being bounded by N number of peripheral edges, one edge of said N-number of edges being an unsmoothed edge and remaining ones of said N-number of edges being smoothed by a smoothing process; and
    a second glass substrate having third and fourth main faces, said second glass substrate being adhered to said first glass substrate with a space formed therebetween and with the third main face facing the second main face.

2. A laminated glass substrate structure according to claim 1, wherein the smoothing process is at least one of heating/melting, dissolving, abrasion, lapping, resin coating.

3. A laminated glass substrate structure according to claim 2, wherein said unsmoothed edge is subjected to resin coating.

4. A laminated glass substrate structure according to claim 1, wherein said second glass substrate is adhered to a partial area of said first glass substrate.

5. A laminated glass substrate structure according to claim 4, wherein the fourth main face is bounded by M number of edges, two of said M number of edges being unsmoothed edges.

6. A laminated glass substrate structure according to claim 1, wherein the laminated glass substrate is a display device.

7. A laminated glass substrate structure according to claim 6, further comprising a liquid crystal layer disposed between said first and second glass substrates, whereby the display device constitutes a liquid crystal display device.

8. A laminated glass substrate structure according to claim 7, wherein the laminated glass substrate structure further comprises a liquid crystal injection port formed on a side face adjacent said unsmoothed edge of said first main face.

9. A laminated glass substrate structure according to claim 1, wherein said unsmoothed edge of said first main face is subjected to resin coating.

10. A laminated glass substrate structure according to claim 1, wherein at least part of said smoothed edges comprises a chamfered portion having a width of 0.1 mm to 0.5 mm.

11. A laminated glass substrate structure according to claim 10, wherein said chamfered portion forms an angle of 120° to 150° with respect to the first main face.

12. A laminated glass substrate structure according to claim 1, wherein two edges among a plurality of edges defining the fourth main face being unsmoothed edges.

13. A laminated glass substrate structure according to claim 6, further comprises a connector connected to the second main face.

* * * * *

UNITED STATES PATENT AND TRADEMARK OFFICE
CERTIFICATE OF CORRECTION

PATENT NO.    : 6,361,867 B2
DATED         : March 26, 2002
INVENTOR(S)   : Kishida et al.

It is certified that error appears in the above-identified patent and that said Letters Patent is hereby corrected as shown below:

<u>Title page,</u>
Item [30], Foreign Application Priority Data, delete "March 19, 1996" and insert -- March 19, 1997 -- therefore.

Signed and Sealed this

Twenty-ninth Day of October, 2002

*Attest:*

*Attesting Officer*

JAMES E. ROGAN
*Director of the United States Patent and Trademark Office*